United States Patent [19]

Pulver et al.

[11] 4,246,838
[45] Jan. 27, 1981

[54] MULTI-ROW DOUGH SLITTING APPARATUS

[75] Inventors: W. Clark Pulver, Burbank; William O. Pulver, Hinsdale; Henry A. Heide, Addison; James J. Diver, South Holland, all of Ill.

[73] Assignee: Velten & Pulver, Inc., Chicago Ridge, Ill.

[21] Appl. No.: 28,387

[22] Filed: Apr. 9, 1979

[51] Int. Cl.³ .......................... B26D 3/08; B26F 3/00
[52] U.S. Cl. ........................................ 99/516; 83/53; 83/177; 83/884; 99/487; 99/536; 425/103; 425/385
[58] Field of Search .................. 99/487, 516, 534, 536, 99/537, 538, 567; 426/503, 383; 264/570; 83/53, 177, 861, 870, 875, 879, 880–884; 425/135, 291, 385, 91, 103, 106, 340, 306

[56] References Cited

U.S. PATENT DOCUMENTS

| | | | |
|---|---|---|---|
| 1,565,887 | 12/1925 | Andrus | 425/385 |
| 2,574,636 | 11/1951 | Gareis | 83/884 |
| 2,858,776 | 11/1958 | Temple | 83/884 |
| 3,649,299 | 3/1972 | Sholl | 99/534 |
| 3,830,608 | 8/1974 | Sebastian | 425/103 |
| 3,978,748 | 9/1976 | Leslie et al. | 83/53 |

FOREIGN PATENT DOCUMENTS

| | | | |
|---|---|---|---|
| 537752 | 1/1930 | Fed. Rep. of Germany | 425/106 |
| 129286 | 1/1977 | Fed. Rep. of Germany | 425/103 |
| 1287585 | 8/1972 | United Kingdom | 83/177 |

Primary Examiner—Philip R. Coe
Assistant Examiner—Timothy F. Simone
Attorney, Agent, or Firm—Vogel, Dithmar, Stotland, Stratman & Levy

[57] ABSTRACT

Apparatus for slitting the upper surfaces of a plurality of parallel rows of proofed dough pieces on a conveyor, including a plurality of spray nozzles respectively in general vertical alignment with the longitudinal midline of the path of each row of proofed dough pieces, a supply of fluid for the nozzles and sprayable thereby in a stream against the upper surfaces of the proofed dough pieces, sensing mechanism for sensing the arrival of the rows of proofed dough pieces between the nozzles, and control mechanism responsive to the sensing mechanism for causing each nozzle to impinge a stream of fluid upon the skin of the associated row of proofed dough pieces as they arrive therebeneath.

6 Claims, 6 Drawing Figures

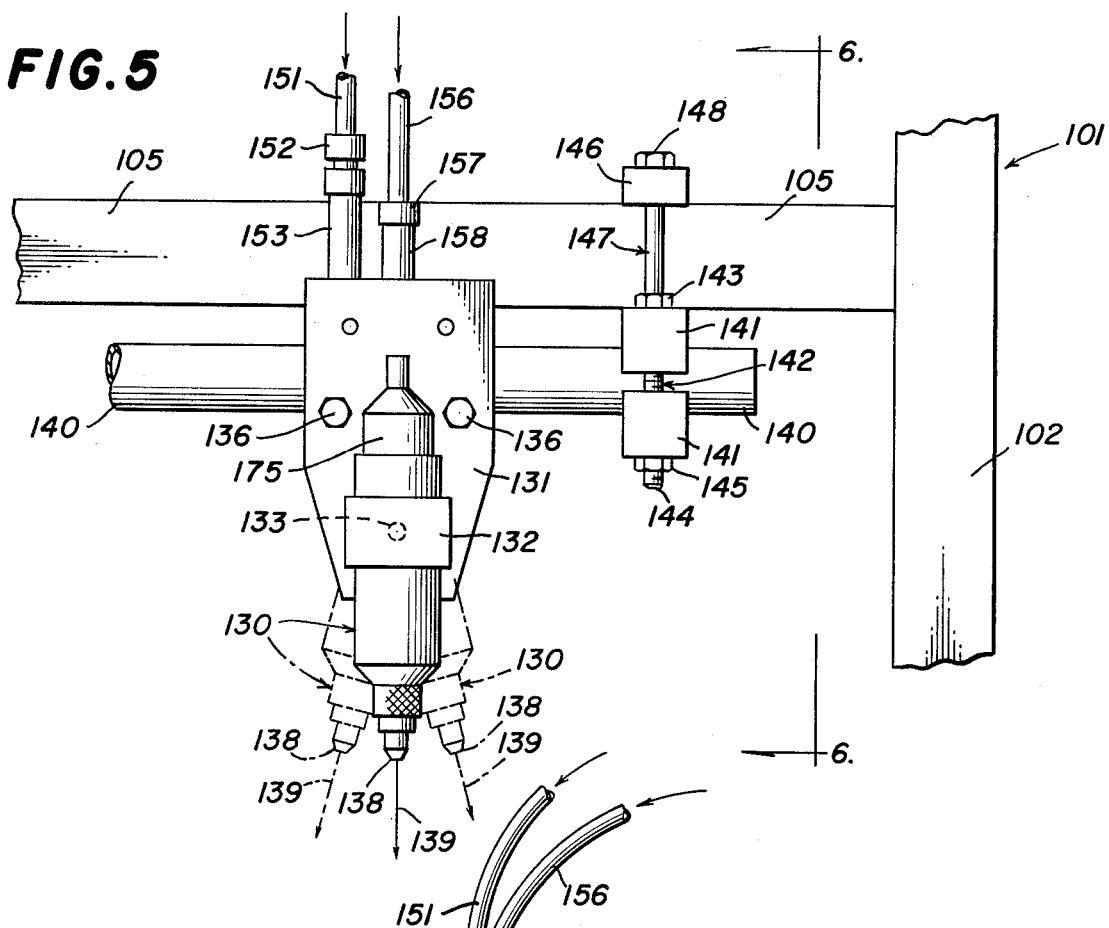
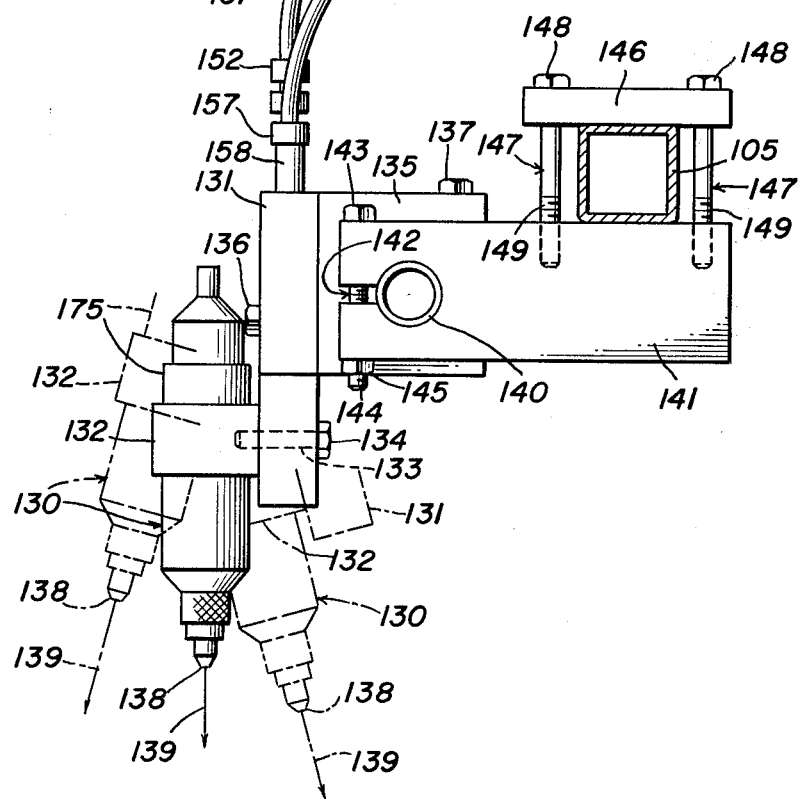

MULTI-ROW DOUGH SLITTING APPARATUS

PRIOR ART STATEMENT AND BACKGROUND OF THE INVENTION

The present invention relates to improvements in apparatus for slitting the upper surfaces of proofed dough pieces, and specifically to the provision of a fluid spray system to accomplish the simultaneous slitting of a plurality or parallel rows of proofed dough pieces.

Standard dough slitters useful heretofore in parallel row arrangements were of the mechanical knife type. These prior mechanical dough slitters required an accurate indexing of the mechanical knives so that the slitting blades are not damaged by hitting pans carrying the proofed dough pieces and yet are in position to effect the slitting operation when the proofed dough pieces are in position for slitting. The prior mechanical knife type of slitter also required frequent sharpening of the slitting blades to insure a good slitting operation, and to insure that the slitting blades did not snag the dough pieces, thus causing a damaged baked product. Difficulty also was experienced with the mechanical type of dough slitter in insuring that the depth of the cut was accurately controlled.

SUMMARY OF THE INVENTION

The present invention provides a dough slitter utilizing fluid streams simultaneously to slit the upper surfaces of parallel rows of proofed dough pieces.

The improved slitting apparatus of the present invention as compared to the mechanical slitters used heretofore does not require accurate indexing, and the slitting mechanism is well spaced from the pans carrying the proofed dough pieces, whereby to protect both the pans and the slitting mechanism. Since there are no slitting blades, there is no requirement for sharpening of the blades and there is no snagging of dough pieces, thus perfect dough pieces are provided using the slitting apparatus of the present invention. Furthermore, the depth of cut or slit can be accurately controlled using the present invention.

This is accomplished in the present invention, and it is an object of the present invention to accomplish these desired results by providing apparatus for slitting the upper surfaces of a plurality of parallel rows of proofed dough pieces comprising a conveyor for carrying a plurality of rows of proofed dough pieces in a predetermined direction, a plurality of spray nozzles respectively disposed above and in general vertical alignment with the longitudinal midline of the path of each row of proofed dough pieces, a supply of fluid connected to each of the nozzles and sprayable thereby in a stream upon the upper surfaces of the proofed dough pieces disposed therebelow to cut through the skins of the proofed dough pieces exposing the interiors thereof, sensing mechanism for sensing the arrival of the rows of proofed dough pieces below the nozzles and for sensing the termination of the rows of proofed dough pieces below the nozzles, and control mechanism for the nozzles responsive to the sensing mechanism for causing the nozzles to impinge a stream of fluid upon the skin of the proofed dough pieces as they arrive beneath the associated nozzles.

Another object of the invention is to provide a slitting apparatus of the type set forth wherein the nozzles are mounted by mounting blocks on a frame disposed adjacent to the associated conveyor, the nozzles being adjustably pivotal about a first axis with respect to the associated mounting block and the mounting block being adjustably pivotal about a second axis with respect to the frame so as to provide for universal adjustable directing of the stream issuing from each of the nozzles.

Yet another object of the invention is to provide a dough slitting apparatus of the type set forth wherein the nozzles can be adjusted within 30° of a vertical longitudinal plane through the midline of the path of the associated proofed dough pieces, and which is adjustable within 30° of a line normal to the midline of the path of travel of the associated proofed dough pieces.

Still another object of the invention is to provide a dough slitting apparatus of the type set forth wherein the fluid utilized is water, oil or margarine at a pressure in the range from about 20 to 40 lbs. per square inch at a rate of about 0.02 gallons per minute.

Further features of the invention pertain to the particular arrangement of the parts of the dough slitting apparatus whereby the above outlined and additional operating features thereof are attained.

The invention, both as to its organization and method of operation, together with further features and advantages thereof will best be understood with reference to the following specification taken in connection with the accompanying drawings.

BRIEF DESCRIPTION OF THE DRAWINGS

FIG. 5 is an enlarged view of one of the spray nozzles and the mounting structure therefor from FIGS. 1-3; and FIG. 6 is a view in section along the line 6—6 of FIG. 5.

DESCRIPTION OF THE PREFERRED EMBODIMENT

Figure 1:
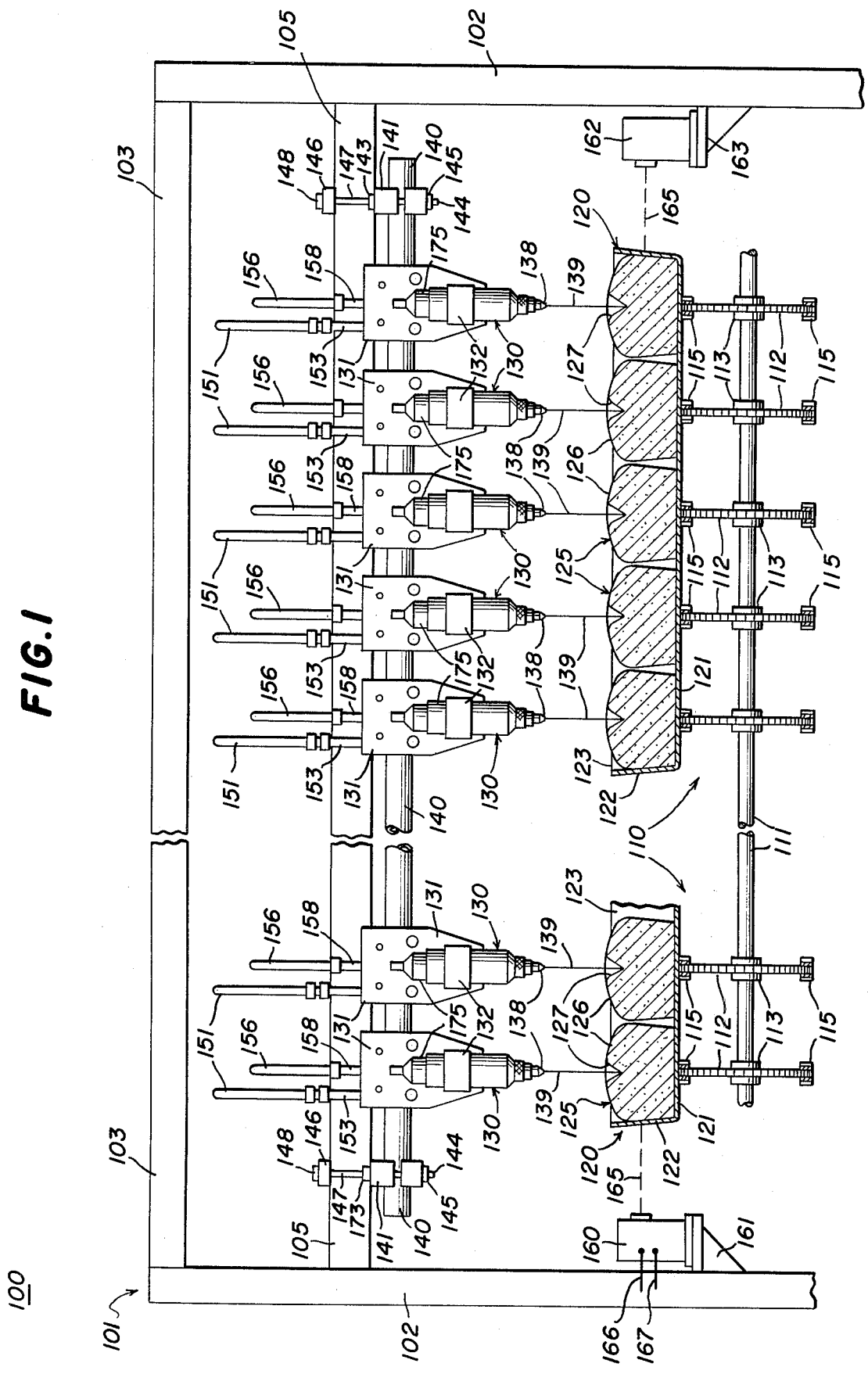
FIG. 1 is a front elevational view of an array of spray nozzles forming a part of the dough slitting apparatus of the present invention and showing the streams therefrom impinging upon a set of proofed dough pieces on a conveyor, all in accordance with the present invention.
Figure 2:
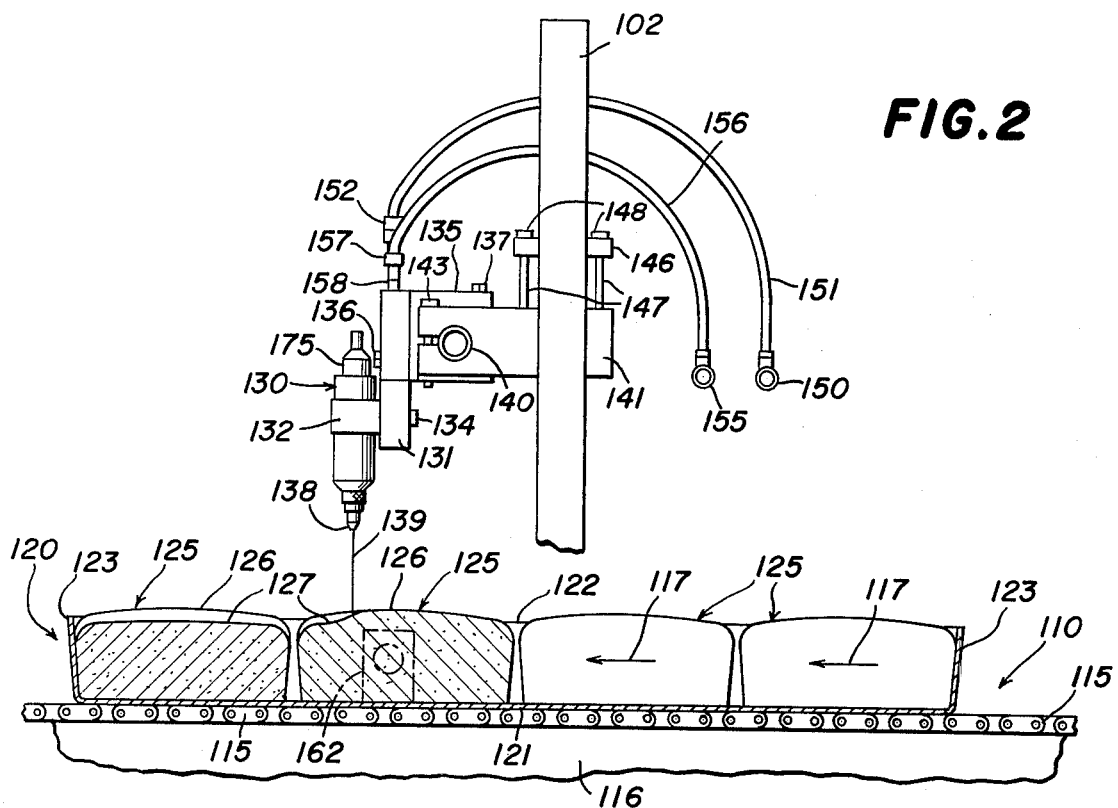
FIG. 2 is a side view of the parts illustrated in FIG. 1 with certain portions broken away.
Figure 3:
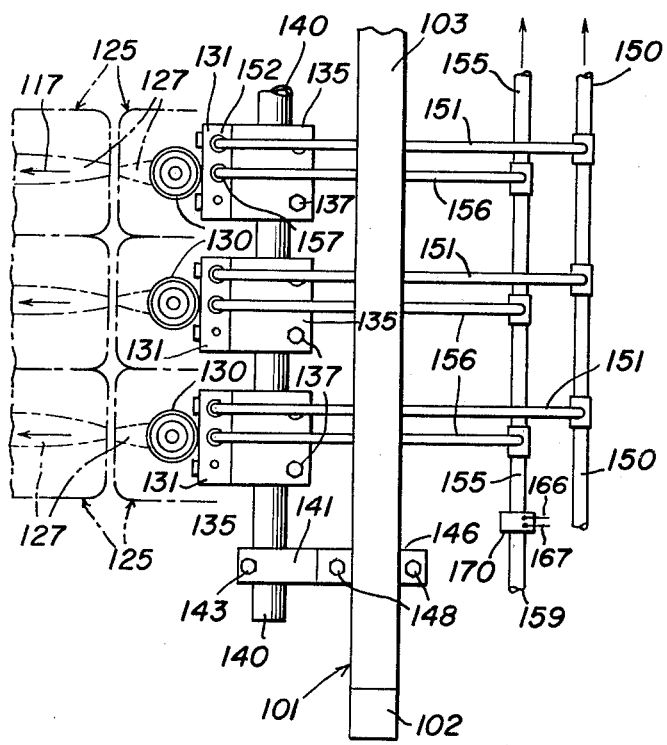
FIG. 3 is a partial plan view of the apparatus of FIGS. 1 and 2.

There is illustrated in FIG. 1 of the drawings a multi-row dough slitting apparatus generally designated by the numeral 100 made in accordance with and embodying the principles of the present invention. The apparatus 100 includes a frame 101 having vertically arranged spaced apart uprights 102 interconnected by cross pieces 103 and 105. Disposed within the frame 101 is a conveyor 110 that carries a plurality of pans 120 containing proofed dough pieces 125 beneath associated overlying nozzles 130. The conveyor 110 comprises a drive axle 111 having spaced apart sprockets 112 fixedly secured thereto by means of hubs 113. Sets of the sprockets 112 carry drive chains 115 that provide support for the pans 120, the upper reaches of the chains 115 being provided with support plates 116 (see FIG. 2)

so as to maintain the pans 120 carried thereby in a predetermined path. As illustrated, the conveyor 110 serves to convey the pans 120 and the proofed dough pieces 125 therein from right to left as illustrated in FIG. 2 and in the direction of the arrows 117. The conveyor 110 is constructed and arranged so as to operate at a continuous uniform rate, at least in the area beneath the nozzles 130.

The pans 120 are the usual type baking pans common in bakeries and include a bottom 121 having upstanding side walls 122 joined to upstanding end walls 123. Disposed within the pans 120 are pieces of proofed dough, the dough being any desired product such as buns, bread, coffee cake, etc. Each dough piece 125 has on the upper surface thereof a top skin 126 in which it is desired to provide a slit 127 (see FIG. 4 particularly) which exposes the interior 128 of the dough piece. The slit 127 is desirable since after baking a lighter color is provided on the interior surface 128 then on the crust formed from the top skin 126, this lighter color providing a pleasing appearing finished baked product. It will be noted that parallel rows of pans 120 are provided on the conveyor 110, and the pans 120 in turn contain essentially parallel rows of proofed dough pieces 125, whereby there is provided on the conveyor 110 what are essentially long rows of proofed dough pieces 125, the rows being essentially parallel and extending longitudinally of the conveyor 110 and in general parallelism with the direction of travel of the proofed dough pieces 125. Furthermore, the proofed dough pieces 125 are generally aligned with the longitudinal axes thereof in the direction of travel, it being desired to produce the slits 127 essentially along the midlines of the proofed dough pieces 125 in the direction of travel thereof.

The production of the slits 127 in the proofed dough pieces 125 in accordance with the present invention is effected by a stream 13 of fluid issuing from the nozzles 130. The nozzles 130 are universally mounted so that the streams 139 therefrom can be accurately positioned with respect to the top skins 126 of the associated row of proofed dough pieces 125. More specifically, the nozzles 130 can be pivoted for adjustment about a first axis that is generally parallel to the direction of travel of the proofed dough pieces 125 and also about a second axis that is normal to the direction of travel of the proofed dough pieces 125.

To obtain this universal adjustability of each of the nozzles 130, and each nozzle 130 independently with respect to each other nozzle 130, each of the nozzles 130 is provided with a mounting block 131 and is secured thereto by a clamp 132 and a pivot bolt 133 having a head 134 (see FIGS. 5 and 6 particularly). By loosening the pivot bolt 133, the nozzle 130 can be pivoted about the axis of the bolt 133 so as to direct the stream 139 toward the midline of the top skin 126 of an associated row of proofed dough pieces 125. Each mounting block 131 is in turn fixedly secured to a mounting plate 135 by two bolts 136 disposed on either side of the associated nozzle 130 and extending through the associated mounting block 131 and into the associated mounting plate 135.

Mounted upon the cross piece 105 of the frame 101 is a support member in the form of a rod 140 (see particularly FIGS. 5 and 6), the rod 140 being secured to and mounted in two mounting clamps 141. More specifically, each mounting clamp 141 has an opening therein receiving the rod 140 therethrough with a slot extending to the forward or left-hand end of the mounting clamp 141 as viewed in FIG. 6. A clamping bolt 142 extends through aligned openings in the mounting clamp 141 and through the slot therein and outwardly through the lower end thereof, the bolt 142 having a head 143 on one end and a threaded shank 144 on the other end. A tightening nut 145 engages the threaded shank 144 and tightening of the nut 145 on the bolt 142 serves to clamp the rod 140 firmly with respect to the mounting clamp 141. The rear or righthand end of the mounting clamp 141 as viewed in FIG. 6 has a plate 146 associated therewith having openings therein receiving two bolts 147 therethrough, the bolts 147 having a head 148 on the upper ends and a threaded shank 149 on the lower end. The threaded shanks 149 are threaded into threaded openings provided respectively therefor in the upper surface of the mounting clamp 141. In the arrangement, the mounting clamp 141 bears against the underside of the cross piece 105 while the plate 146 bears against the upper side of the cross piece 105, the bolts 147 clamping the cross piece 105 firmly between the mounting clamp 141 and the plate 146. In this fashion, the mounting clamps 141 are securely affixed with respect to the cross piece 105.

The mounting plates 135 are also provided with an opening therethrough to receive the rod 140 and a slot extends from that opening to the rear or right-hand end of the mounting plate 135 as viewed in FIG. 6. Two clamping screws 137 are provided in openings in the upper portion of the mounting plate 135 and extend into threaded openings in the lower portion thereof beyond the associated slot, whereby tightening of the clamping screws 137 serves to clamp the mounting plate 135 upon the rod 140. By loosening the clamping screw 137 for a particular nozzle 130, the individual mounting plate 135 can be pivoted about the axis of the rod 140. Alternatively, with each of the mounting plates 135 fixedly clamped to the rod 140, all of the nozzles 130 can be pivoted about the axis of the rod 140 by loosening the bolts 142 so that the rod 140 can be pivoted with respect to the mounting clamps 145, thus simultaneously adjusting all of the nozzles 130.

From the above described mounting structure for the nozzles 130, it will be seen that the direction of the fluid stream 139 issuing from a particular nozzle 130 can be adjusted in a plane normal to the direction of travel of the proofed dough pieces 125 as is illustrated by the three positions in FIG. 5, this adjustment being accomplished by loosening and subsequently tightening the pivot bolt 133. More specifically, each nozzle 130 can be adjusted about a first axis that is essentially horizontal and extends in the direction of travel of the conveyor 110 and the proofed dough pieces 125 thereon. By means of the clamping screws 137, the direction of the stream 139 issuing from a nozzle 130 can be adjusted in a plane parallel to the direction of travel of the conveyor 110 and the proofed dough pieces 125 thereon, this being diagrammatically illustrated in FIG. 6 by the three different positions of the nozzle 130 illustrated therein. Alternatively, all of the nozzles 130 can be simultaneously adjusted so as to move the streams 139 therefrom in a plane parallel to the direction of travel of the conveyor 110 and the proofed dough pieces 125 by loosening the bolts 142 and pivoting the rod 140 to the desired adjusted position. This pivoting is about a second axis that is normal to the direction of travel of the conveyor 110 and the proofed dough pieces 125 thereon, the second axis being essentially along the longitudinal axis of the rod 140 and normal to the first axis that is through the longitudinal axis of the pivot bolts 133.

A preferred fluid for generating the streams 139 is water, at a pressure of 35 to 40 lbs. per square inch, but other fluids such as margarine, butter, oil, etc. may be used instead of water, in which case the pressure of the streams 139 may be as low as 20 lbs. per square inch. In the embodiment illustrated, a water manifold 150 is provided (see FIG. 2) to which are connected a plurality of water lines 151, a water line 151 being provided for each of the nozzles 130. Each of the water lines 151 is connected by a coupling 152 to a water pipe 153 connecting with an opening in the mounting block 131 (see FIGS. 5 and 6). The water pipe 153 connects with the associated nozzle 130 and disposed within the nozzle 130 is an air controlled valve 175 which controls the flow of water from the pipe 153 to an orifice 138 at the lower end of the nozzle 130, the orifice 138 when the air controlled valve is open forming the water stream 139 issuing from the lower end of the nozzle 130.

The air controlled valve 175 is controlled from an air manifold 155 (see FIG. 2). Connecting with the air manifold 155 are air lines 156, one of the air lines 156 being provided for each of the nozzles 130. Referring to FIGS. 5 and 6, it will be ssen that the air line 156 for a nozzle 130 is connected by a coupling 157 to an air pipe 158 that communicates through openings in the mounting block 131 to the air controlled valve 175 within the associated nozzle 130. When air pressure is provided through the air manifold 155 and the air line 156, the air controlled valve 175 is opened so as to permit a stream of water to flow from the orifice 138 of the nozzle 130. When the air manifold 150 and the connected air lines 156 are vented, the air controlled valve 175 is closed and no stream 139 issues from the orifice 138 of the associated nozzle 130. The air manifold 155 is provided with a source 159 of air under pressure through a control valve 170, the operation of the control valve 170 to be more fully explained hereinafter.

In order to detect the presence of proofed dough pieces 125 in position to be slit by the streams 139, there has been provided a photo-electric eye 160 (see FIG. 1) mounted on a bracket 161 on one upright 102 and opposite a light source 162 mounted on a bracket 163 on the opposed upright 102. In the absence of pans between the photoelectric eye 160 and the light source 162, a beam 165 of the light is established. When the beam 165 is broken by a pan 120, a signal is generated by the photo-electric eye 160 that is conveyed by conductors 166 and 167 to the solenoid control valve 170. Actuation of the control valve 170 opens the path from the air source 159 to the air manifold 155, thus to actuate the air controlled valves 175 associated with each of the nozzles 130. The air controlled valves 175 establish a path for water from the water manifold 150 through the water lines 151 and to the orifices 138, whereby to generate the water streams 139. As soon as the light beam 165 is reestablished, the control signal on the conductors 166-167 is removed and the solenoid valve 170 closes and vents the air manifold 155 to the atmosphere. This action serves to close the air controlled valves 175 and thus interrupt the water streams 139.

In the operation of the multi-row dough slitting apparatus, it is preferred that the nozzles 130 all be in alignment along the rod 140 with the water streams 139 thereof directed vertically and with the nozzles 130 arranged and positioned laterally with respect to the rod 140 so that the water streams 139 strike the midline of the path of the associated row of proofed dough pieces. The photo-electric eye 160 and the light source 162 are disposed a short distance upstream or to the right as viewed in FIG. 2 with respect to the line of nozzles 130. As a result, as the leading edge of the first pan 120 cuts the light beam 165, a signal is generated on the conductors 166 and 167 which actuates the control valve 170 that in turn operates the air controlled valves 175 to establish the water streams 139, all before the first piece of proofed dough arrives below the associated nozzle 130. As soon as the trailing end of the last pan 120 clears the light beam 165, the electrical signal is removed from the conductors 166 and 167 which closes the control valve 170 and vents the air manifold 155 to the atmosphere. This closes the air controlled valves 175 in each of the nozzles 130 and interrupts the water streams 139.

The following is a description of the operation of the multi-row dough slitting apparatus of the present invention. A source of water is connected to the water manifold 150, a source of air is connected to the control valve 170, and the photo-electric eye 160 and its light source 162 are energized, thus establishing the light beam 165, the control valve 170 being closed and the air manifold 155 vented to atmosphere. After checking the alignment of the nozzles 130, the operator starts the conveyor 110 and places pans 120 thereon with proofed dough pieces 125 therein. The nozzles 130 have been aligned with the midline of the path of the associated proofed dough pieces as described above. As the leading edge of the first pan 120 breaks the light beam 165, a signal is provided to the conductors 166-167 which is applied to the control valve 170 to connect the air source 159 to the air manifold 155. The air controlled valves 175 associated with the nozzles 130 are actuated so as to create a path for water from the water manifold 150 through the water lines 151 and the orifices 138 to establish the water streams 139.

Figure 4:
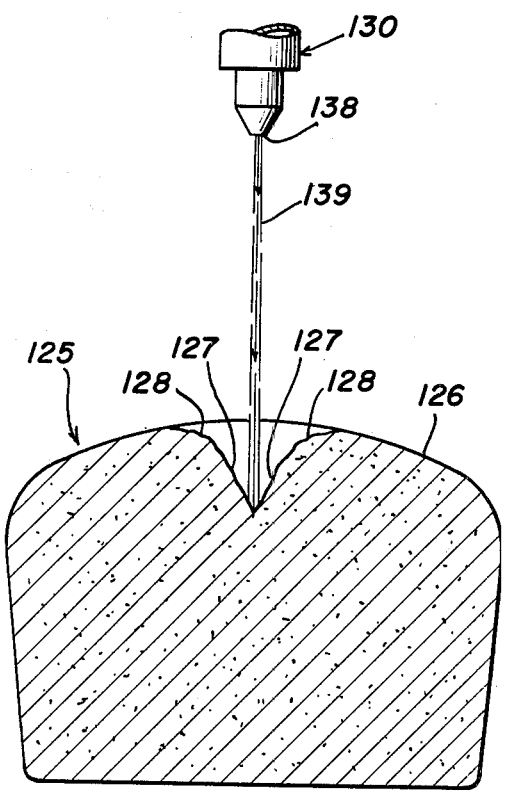
FIG. 4 is an enlarged view with certain parts broken away and others in section illustrating the manner in which the fluid stream from a nozzle of the present invention slits the skin on the upper surface of a proofed dough piece.

As is best seen in FIG. 4, the water stream 139 from the associated nozzle 130 is directed at essentially the midline of the path of travel of the proofed dough piece 125 disposed therebeneath. The force of the water stream 139 slits the top skin 126 on the upper surface of the proofed dough piece 125. The slit 127 exposes a portion of the interior 128 of the proofed dough piece 125. In the subsequent baking operation, the top skin 126 is baked to form a crust which is of darker color than the interior surfaces 128 exposed by the slit 127. Such slit dough pieces when baked are highly decorative and desirable in the market place.

So long as the light beam 165 is broken by the presence of a pan 120, the water stream 139 continues to operate and slits the upper surface of the associated proofed dough piece 125. As soon as the trailing end of the last pan 120 clears the light source 162, the light beam 165 is reestablished. This removes the signal from the conductors 166-167 and causes the control valve 170 to close disconnecting the air source 159 from the air manifold 155 and venting the air manifold 155 to atmosphere. The air controlled valves 175 now close and the water streams 139 are interrupted. The parts can be held in this condition until the next set of proofed dough pieces are ready, at which time the interruption of the light beam 165 by the first pan carried by the conveyor 110 will initiate the slitting operation once more.

As has been pointed out heretofore, other fluids in addition to water may be used to create the slitting streams 139. For example, margarine, butter, oil, and the like may be utilized instead of water. The nozzles 130 can also be adjusted to emit an intermittent stream, rather than a solid stream 139. Although the preferred orientation of the nozzles 130 and the streams 139 therefrom is vertical, it is also possible to operate the multi-row dough slitting apparatus 100 with the fluid streams 139 in positions other than vertical. More specifically, the nozzles 130 can be adjusted about the first axis (the longitudinal axis of the pivot bolt 133 as illustrated in FIG. 5) so that the streams 139 therefrom are within an enclosed angle that is from about 30° on one side of a vertical longitudinal plane through the midline of the path of the associated row of proofed dough pieces to a position within 30° on the other side of a vertical longitudinal plane through the midline of the path of the associated row of proofed dough pieces. Likewise, the nozzles 130 can be adjusted about the second axis (the longitudinal axis of the rod 140 as seen in FIG. 6). More specifically, in the adjustment about the second axis, the streams 139 from the nozzles 130 can be positioned within 30° of lines normal to the midline of the paths of travel of the rows of proofed dough pieces on either side thereof.

When water is the fluid being used to create the streams 139, the pressure thereof is preferably in the range from about 35 lbs. per square inch to about 40 lbs. per square inch. The orifices 138 in the nozzles 130 have a diameter of about 0.02 inch, whereby about 0.02 gallons per minute of water are supplied through each nozzle 130. The rate of passage of the proofed dough pieces beneath the nozzles 130 is in the range from about 25 feet per minute to about 100 feet per minute. The amount of water provided by each nozzle 130 and its stream 139 and the pressure of the stream can be adjusted to accommodate this wide range of flow of proofed dough pieces and also to control the depth of the cut or slit 127 in the top skin 126 of the proofed dough pieces 125. A preferred example of the nozzle 130 is Nozzle No. ¼TT- 000050 made by Spraying Systems Co.

While there have been described what are at present considered to be the preferred embodiments of the invention, it will be understood that various modifications may be made therein and it is intended to cover in the appended claims all such modifications as fall within the true spirit and scope of the invention.

What is claimed is:

1. An apparatus for slitting the upper surfaces of a plurality of essentially parallel rows of proofed dough pieces on a conveyor conveying the rows of proofed dough pieces in a predetermined direction, the combination comprising a frame mounted adjacent to said conveyor and extending thereover and including a support member extending across said conveyor and disposed thereabove, a plurality of spray nozzles each including a mounting block adjustably pivotally mounting the associated nozzle for pivotal movement with respect thereto about a first axis extending substantially parallel to the path of associated rows of proofed dough pieces along the conveyor, each of said mounting blocks being adjustably pivotally mounted on said support member for pivotal movement about a second substantially horizontal axis disposed essentially normal to said first axis, each of said nozzles being in general vertical alignment with the longitudinal midline of the path of the associated row of proofed dough pieces, a supply of fluid connected to each of said nozzles and sprayable thereby in a stream upon the upper surfaces of the proofed dough pieces disposed therebelow to cut through the skins of the proofed dough pieces exposing the interiors thereof without cutting completely therethrough, each of said nozzles being adjustable about the associated first axis and the associated second axis so as accurately to impinge the stream of fluid therefrom at the desired point on the upper surfaces of the associated row of proofed dough pieces, each of said nozzles including an air valve controlling the issuance of the fluid stream therefrom and each air valve being connected to an air line having a control valve therein, and sensing mechanism for sensing the arrival of the rows of proofed dough pieces below said nozzles and for sensing the termination of the rows of proofed dough pieces below said nozzles, said control valve being responsive to said sensing mechanism to actuate said air valves to cause said nozzles to spray a stream of fluid therefrom upon the skin of the proofed dough pieces as they arrive beneath the associated nozzles, thereby continuously to cut through the skins of the rows of proofed dough pieces passing under said nozzles.

2. The combination set forth in claim 1, wherein said supply of fluid is a supply of water.

3. The combination set forth in claim 1, wherein said supply of fluid is at a pressure in the range from about 35 lbs. per square inch to about 40 lbs. per square inch.

4. The combination set forth in claim 1, wherein said sensing mechanism is a photo-electric eye.

5. The combination set forth in claim 1, wherein said nozzles are adjusted about said respective first axis so that the streams therefrom are within 30° of a vertical longitudinal plane through the midline of the path of the associated row of proofed dough pieces.

6. The combination set forth in claim 1, wherein said nozzles are adjusted about said respective first axis so that the streams therefrom are within 30° of a vertical longitudinal plane through the midline of the path of the associated row of proofed dough pieces, and said mounting blocks are adjusted about said second axis so that the streams from said nozzles are within 30° of lines normal to the midline of the paths of travel of the rows of proofed dough pieces.

* * * * *